US005606253A

United States Patent [19]
Boucher et al.

[11] Patent Number: 5,606,253
[45] Date of Patent: Feb. 25, 1997

[54] GUIDED FLOW MARINE SPEEDOMETER INCLUDING ANGULARLY SHAPED HOUSING FOR GUIDING WATER TO A PADDLEWHEEL SENSOR AT THAT ANGLE

[75] Inventors: Stephen G. Boucher, Amherst; Maurice P. Lagace, Peterborough; Robert K. Jeffers, Wilton, all of N.H.

[73] Assignee: Airmar Technology Corporation, Milford, N.H.

[21] Appl. No.: 317,727

[22] Filed: Oct. 4, 1994

[51] Int. Cl.$^6$ ................................ G01P 3/44; G01P 3/66
[52] U.S. Cl. .............................................. 324/174; 73/187
[58] Field of Search ................................ 324/167, 173, 324/174, 207.25, 207.24, 160; 73/861.79, 861.85, 861.86, 861.87, 861.88, 861.89, 861.91, 861.92, 187, 181

[56] References Cited

U.S. PATENT DOCUMENTS

| 3,137,164 | 6/1964 | Spencer | 73/187 |
|---|---|---|---|
| 3,496,770 | 2/1970 | Fassett | 73/187 |
| 3,664,189 | 5/1972 | Weinstein | 73/185 |
| 3,706,224 | 11/1972 | Overs | 73/187 |
| 3,744,257 | 7/1973 | Spanner | 210/242 X |
| 4,206,637 | 6/1980 | Pankonien | 73/187 |
| 4,416,210 | 11/1983 | Lacy, Jr. et al. | 180/121 |
| 4,512,201 | 4/1985 | Konrad et al. | 73/861.79 |
| 4,546,650 | 10/1985 | Cameron | 324/171 X |
| 4,555,938 | 12/1985 | Boucher et al. | 73/187 |
| 4,570,497 | 2/1986 | Han | 73/861.79 |
| 4,644,787 | 2/1987 | Boucher et al. | 73/187 |
| 4,898,029 | 2/1990 | Boucher | 73/187 |
| 5,166,906 | 11/1992 | Curtis et al. | 367/134 |
| 5,182,952 | 2/1993 | Pyzik | 73/861.79 |
| 5,369,360 | 11/1994 | Amyot | 324/174 |
| 5,377,439 | 1/1995 | Roos et al. | 43/3 |

*Primary Examiner*—Sandra L. O'Shea
*Assistant Examiner*—Roger C. Phillips
*Attorney, Agent, or Firm*—Hamilton, Brook, Smith & Reynolds, P.C.

[57] ABSTRACT

A marine speedometer for mounting to the exterior transom of a marine vessel includes a housing mounted to the transom flush with the bottom surface of the hull. A paddlewheel affixed to the housing has an outer periphery which extends no further than the bottom surface of the hull of the marine vessel. A portion of the housing adjacent to the bottom surface of the hull is shaped to direct a flow of water passing by the transom upwards into the paddlewheel to rotate the paddlewheel.

29 Claims, 3 Drawing Sheets

GUIDED FLOW MARINE SPEEDOMETER INCLUDING ANGULARLY SHAPED HOUSING FOR GUIDING WATER TO A PADDLEWHEEL SENSOR AT THAT ANGLE

BACKGROUND

Marine speedometers for measuring the velocity of a marine vessel traveling over water typically include a housing recessed in the hull or mounted on the transom of the marine vessel in which a paddlewheel is mounted. The paddles of the paddlewheel extend below the hull so that water flowing under the hull can turn the paddlewheel. The rotation of the paddlewheel is then converted into the speed of the vessel relative to the water. An example of such a marine speedometer is found in U.S. Pat. No. 3,706,224.

A drawback with this type of marine speedometer is that the protruding paddles of the paddlewheel can be damaged if struck by objects floating in the water or if pressed against the frame of a boat trailer when loaded onto the trailer.

One solution to this problem is to recess the paddlewheel flush with or above the level of the hull such that the paddlewheel does not extend beyond the surface of the hull. Such a marine speedometer is currently sold as part no. 278 00 276 by Bombardier Corporation (FIG. 1) which is fitted into the hull surface 62. In order to direct the water through the paddles of the recessed paddlewheel 64, the bombardier speedometer housing 66 includes a gradually recessed channel 68 about ½ inch deep at its deepest point and between about 3 ½ inches and 4 inches long. The channel includes a curved transition portion 70 comprising two radii which joins a horizontal portion 72. The water passing under the speedometer follows the transition portion 70 of the channel 68 and then flows parallel to the hull 62 within the horizontal portion 72 of the channel 68 into the paddlewheel 64. The paddlewheel 64 projects below the upstream surface of the horizontal portion 72 of the channel 68. The flow regime of the water as it engages the paddlewheel is similar to that taught in U.S. Pat. No. 4,664,787. The Bombardier speedometer relies upon the pressure of the water under the hull caused by the weight of the boat on the water to direct the water along the channel. A drawback with this design is that the Bombardier speedometer requires two radii to recess the flow channel and, therefore, the speedometer is quite long making it impractical for transom mounting.

SUMMARY OF THE INVENTION

Accordingly, there is a need for a compact marine speedometer which is not easily damaged and is cheaper and easier to install than existing through-hull speedometers.

The present invention resides in a marine speedometer for mounting to the exterior transom of a marine vessel. The marine vessel has a hull with a bottom surface. The speedometer includes a housing mounted to the transom. The housing has a periphery which extends no further than the bottom surface of the hull. A paddlewheel is affixed to the housing. The paddlewheel has an outer periphery which extends no further than the bottom surface of the hull of the marine vessel. A portion of the housing adjacent to the bottom surface of the hull is shaped to direct a flow of water passing by the transom into the paddlewheel to rotate the paddlewheel.

In preferred embodiments, the shaped portion of the housing adjacent to the bottom surface of the hull gradually recesses into the housing about 2 mm in the vertical plane along a radius to direct the flow of water into the paddlewheel. The length of the shaped portion of the housing ranges from about 6 mm to 50 mm and the radius of the shaped portion of the housing ranges from about 75 mm to 150 mm. The small dimensions of the shaped portion of the housing result in a speedometer of compact size. A Hall-effect sensor is mounted within the housing for sensing rotation of the paddlewheel which is preferably formed of magnetic material. In one preferred embodiment of the present invention, the outer periphery of the paddlewheel is located above the bottom surface of the hull.

The present invention marine speedometer is capable of directing unpressurized or slightly pressurized water upwards into the paddlewheel and, as a result, can be mounted to the exterior transom of a marine vessel. Since the present invention speedometer is compact and does not extend below the hull, it is not readily subjected to damage. The small size of the present invention speedometer makes it suitable for use on power boats as well as personal water craft (for example, Jet Skis™).

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1A:
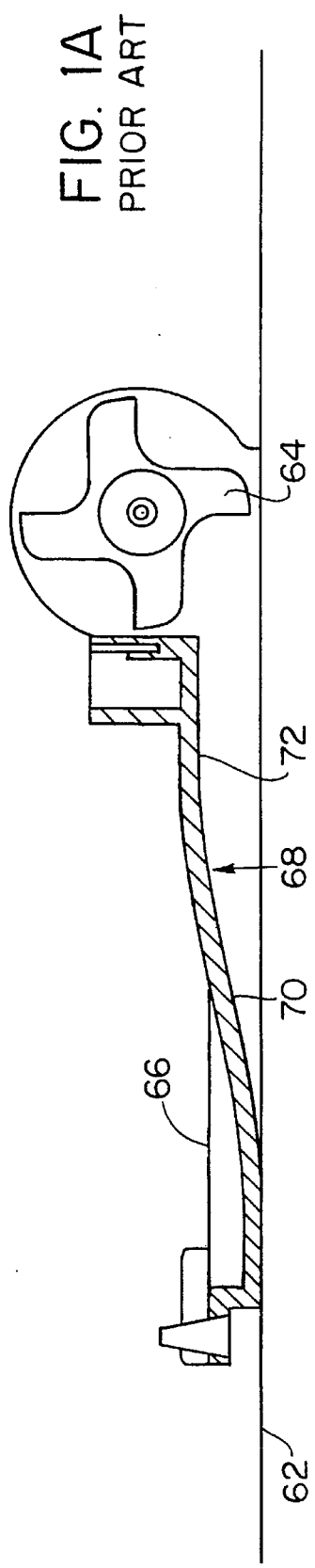
FIG. 1A is a side sectional view of the prior art Bombardier speedometer.
Figure 2:
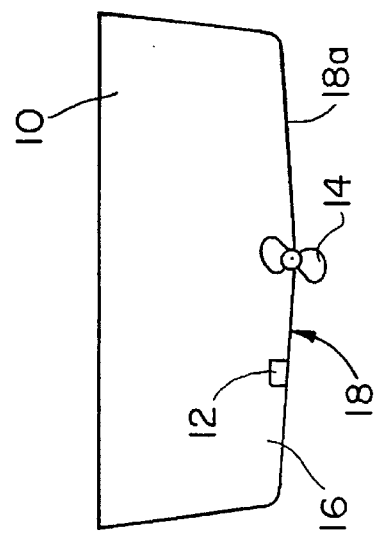
FIG. 2 is a rear view of the marine vessel showing the present invention marine speedometer mounted to the transom.
Figure 1B:
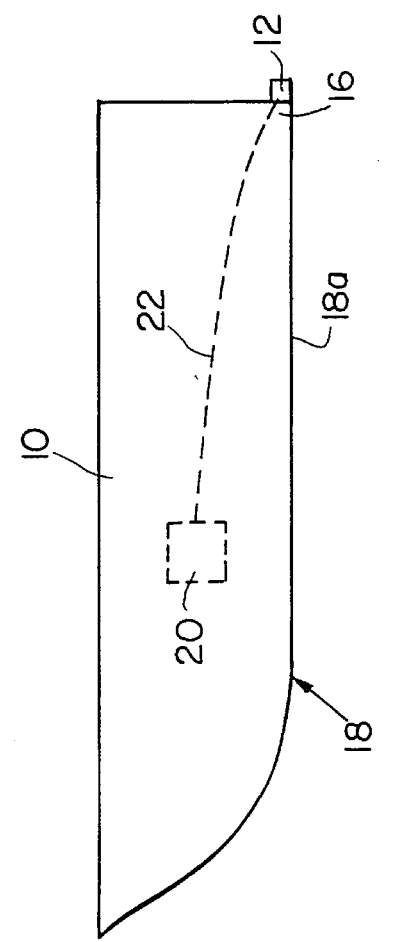
FIG. 1B is a side view of a marine vessel showing the present invention marine speedometer mounted to the transom of the vessel.

Referring to FIGS. 1B through 4, marine speedometer 12 is mounted to the transom 16 of marine vessel 10 on one side of propeller 14 flush with the bottom surface 18a of hull 18. Speedometer 12 includes a housing 43 made of an electromagnetically permeable material, such as polycarbonate or other suitable plastics. Housing 43 incudes an enclosed portion 42. Extending rearwardly from enclosed portion 42 are two parallel vertical flange members 32 which form a channel 40 therebetween. A smooth flat surface 30 extends across a portion of the bottom of housing 43. A shaped surface 28 extends across the center of bottom surface 30 and gradually recesses or curves into bottom surface 30 until terminating within channel 40. A paddlewheel 26 having a plurality of paddles 26a is rotatably mounted between flange members 32 within channel 40. Paddlewheel 26 is made of magnetic material with the paddles 26a having alternating North and South poles.

Enclosed portion 42 houses a Hall-effect sensor 38 mounted on the interior of rear wall 34 adjacent to paddlewheel 26. Hall-effect sensor 38 senses the rotation of paddlewheel 26 by sensing alternating North and South poles as paddlewheel 26 rotates. Hall-effect sensor 38 is provided with power from a DC power supply (not shown) having an output which ranges from about 5 to 18 volts DC.

A speedometer display 20 is connected to Hall-effect sensor 38 by line 22 for receiving signals from Hall-effect sensor 38 and converting those signals into a visual read-out indicative of the marine vessel's speed. The use of a Hall-effect sensor for measuring the rotation of a magnetic paddlewheel in the present invention is similar to that described in U.S. Pat. Nos. 4,555,938 and 4,644,787 which are herein incorporated by reference in their entirety.

In operation, as marine vessel 10 is propelled across water, the water over which the transom 16 passes over is released from the pressure exerted on it by hull 18. The water leaves the transom at ambient pressure (no pressure) or at most, close to ambient pressure (slight pressure) and is directed upwards by shaped portion 28 of housing 43. (This is in contrast to the Bombardier speedometer which requires the water to be pressurized by the weight of the vessel to flow upwards into the recessed channel.) Shaped surface 28 gradually curves upwardly into bottom surface 30 and guides this water into channel 40 through paddlewheel 26, thereby rotating paddlewheel 26. As paddlewheel 26 rotates, the alternating North and South poles of paddles 26a cause magnetic field variations due to polarity changes which are sensed by Hall-effect sensor 38. In response to the sensed alternating North and South poles, Hall-effect sensor 38 generates a DC alternating squarewave voltage signal of an amplitude approximately equal to the DC input voltage (typically 5–18 volts DC). The frequency of the voltage signal is directly proportional to the rotational speed of the paddlewheel. Speedometer display 20 converts this voltage signal into the velocity of the vessel relative to the water with an internal processor. Speedometer 12 is capable of measuring the speed of marine vessel 10 relative to the water accurately at speeds ranging from about 2 miles/hour to 60 miles/hour. For speeds ranging between 2 miles/hour and 8 miles/hour, the frequency of the voltage signal is not linear relative to the velocity of the vessel and must be compensated for by a signal processor within speedometer display 20.

Figure 3:
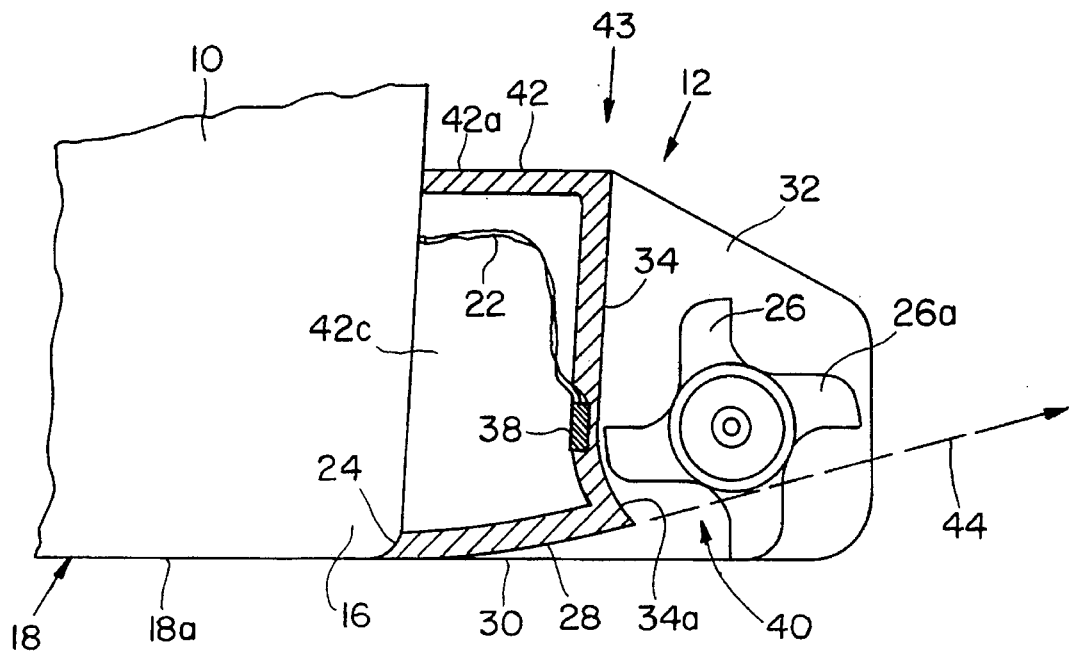
FIG. 3 is a side sectional view of the present invention marine speedometer mounted to the transom of the marine vessel.
Figure 4:
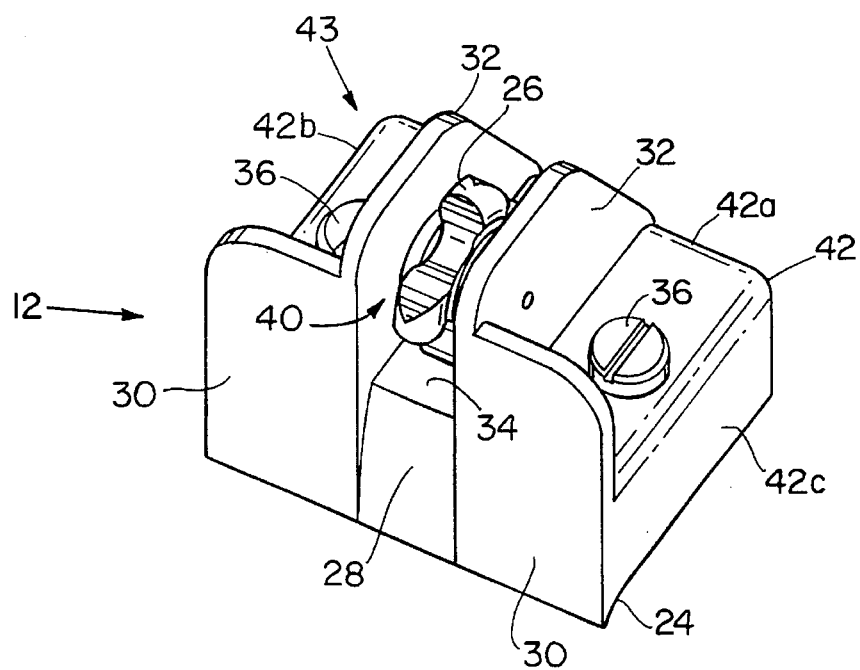
FIG. 4 is a perspective view of the present invention marine speedometer.

The following is a more detailed description of the present invention speedometer. Referring to FIGS. 3 and 4, speedometer 12 is mounted to the transom 16 by two screws 36. Housing 43 has a curved surface 24 which mates with the corner of transom 16 to provide a smooth transition between the bottom surface 18a of hull 18 and speedometer 12. Enclosed portion 42 is enclosed on five sides by top wall 42a, sidewalls 42b and 42c, rear wall 34, bottom surface 30 and shaped surface 28. The open side of enclosed portion 42 is closed off when housing 43 is mounted to transom 16. Housing 43 is compact with enclosed portion 42 being, for example, about ¾ inches long (19 mm), 2 inches wide (50 mm) and 1½ inches high (38 mm). Additionally, flange members 32 are about 1¼ inches high (32 mm) and extend about 1¼ inches (32 mm) away from rear wall 34. This makes the length of housing 43 about 2 inches long (50 mm).

Shaped portion 28 is flush with bottom surface 30 near transom 16 and gradually recesses or curves into bottom surface 30 before terminating within channel 40. The rear wall 34 of enclosed portion 42 has a curved portion 34a which extends toward paddlewheel 26. This curved portion 34a allows shaped portion 28 to extend closer to paddlewheel 26, thereby directing the flow of water 44 more precisely into the paddles 26a of the paddlewheel 26. Shaped portion 28 has a gradual curve with a radius large enough to bend the water upward into paddlewheel 26 gradually so that the water does not separate from shaped portion 28. If the radius of shaped portion 28 is too sharp, the flow of water 44 will separate from shaped portion 28 and pass under paddlewheel 26 instead of through it. The radius of shaped portion, for example, preferably ranges between about 75 mm and 150 mm. Furthermore, shaped portion 28 recesses into surface 30 about 2 mm, is between about 6 mm and 50 mm long, and is 16 mm wide. A longer shaped portion 28 would typically be used for vessels traveling at high speeds while a smaller radius would be used for directing water into paddlewheel 26 that is under higher pressure.

The paddlewheel 26 consists of a hub portion from which four paddles 26a extend. The diameter of paddlewheel 26 preferably ranges from about 1 to 1½ inches (25 mm to 38 mm). The paddlewheel 26 is formed of an amorphous magnetic material, such as barium ferrite by an injection molding process. After formation of the paddlewheel 26, the paddles 26a are electromagnetically polarized in a magnetic field such that the polarity of the paddles 26a at each tip alternates from North to South. Alternatively, the hub may be of one polarity and each of the paddles of an opposite polarity. Other possible polarity patterns are contemplated depending on the sensor application. Additionally, paddlewheel 26 can have more than four paddles or less than four paddles.

The front and back surfaces respectively, of the paddles 26a are angularly offset from each other to form an asymmetric shape which maximizes the difference in coefficient of drag between the front and back surfaces. The front surface extends almost radially from the hub and consequently has a relatively high coefficient of drag, whereas the back surface extends tangentially from the hub and has a lesser coefficient of drag as it passes through the water. With this paddle configuration, the tendency to stall at lower speeds is greatly reduced.

Figure 5:
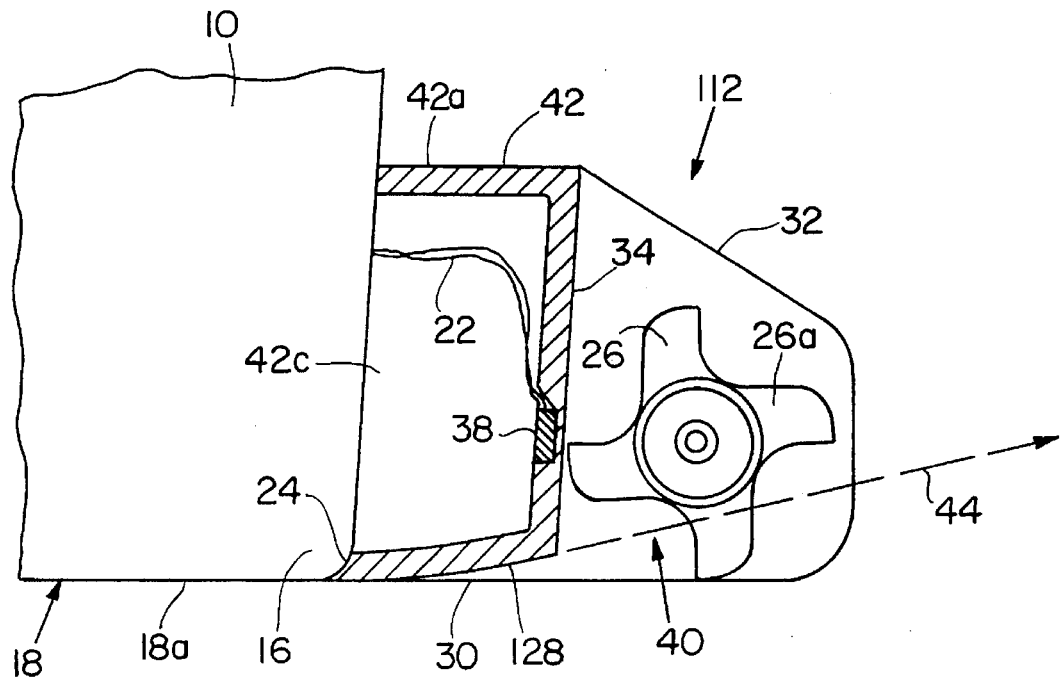
FIG. 5 is a side sectional view of another preferred embodiment of the present invention marine speedometer mounted to the transom of the marine vessel.

Referring to FIG. 5, speedometer 112 is another preferred embodiment of the present invention. Speedometer 112 is similar to speedometer 12 except that rear wall 34 is a straight wall such that shaped portion 128 does not extend as close to paddlewheel 26 as shaped portion 28.

Figure 6:
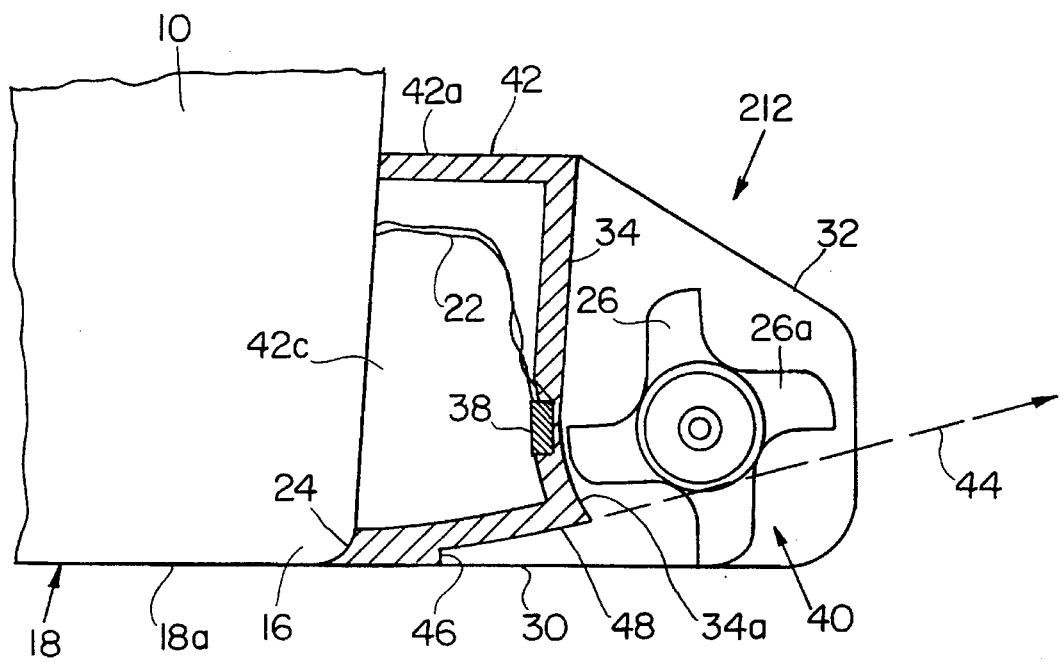
FIG. 6 is a side sectional view of still another preferred embodiment of the present invention marine speedometer mounted to the transom of the marine vessel.

Speedometer 212 in FIG. 6 is another preferred embodiment of the present invention and differs from speedometer 12 in that shaped portion 48 includes a tripping edge 46 on bottom surface 30. Tripping edge 46 provides the transition between bottom surface 30 and shaped portion 48 which is recessed within bottom surface 30. Tripping edge 46 directs water flow 44 upward onto shaped portion 48 which, in turn, directs the water flow 44 through paddlewheel 26. The water flow 44 leaving transom 16 should be under slight pressure for speedometer 212 to operate accurately (linearly).

Although the outer periphery of paddlewheel 26 has been shown in the figures to be flush with the bottom of the speedometer housing and the hull, paddlewheel 26 can be raised so that its outer periphery is up to about 0.1 inches (2.5 mm) above the bottom of the housing.

Equivalents

While this invention has been particularly shown and described with references to preferred embodiments thereof, it will be understood by those skilled in the art that various changes in form and details may be made therein without departing from the spirit and scope of the invention as defined by the appended claims. For example, paddlewheels of other configurations and non-magnetized paddlewheels can be employed. Additionally, other suitable sensors can be used in place of the Hall-effect sensor such as a proximity sensor. Furthermore, although specific dimensions for the components of speedometer 12 have been given, the dimensions of the housing and paddlewheel can be varied depending upon the application and the marine vessel to which the speedometer is secured. Also, paddlewheel 26 can be mounted to the transom in a manner in which the radius on the corner of the transom 16 serves as a shaped portion for directing water into paddlewheel 26. The shape of the corner of the transom upstream of the paddlewheel can be tailored for maximum performance. In such a case, shaped portion 28 is omitted.

What is claimed is:

1. A marine speedometer for mounting to the exterior transom of a marine vessel, the marine vessel having a hull with an outer surface that includes a bottom surface, the speedometer comprising:

a housing having an outer periphery, the housing being mounted to the transom such that the housing extends beyond the outer surface of the hull, the outer periphery of the housing extending downwardly no further than the bottom surface of the hull at the transom; and a paddlewheel affixed to the housing, the paddlewheel having an outer periphery which extends beyond the outer surface of the hull and extends downwardly no further than the bottom surface of the hull of the marine vessel at the transom, a portion of the housing adjacent to the bottom surface of the hull being shaped to direct a flow of water passing by the transom upwardly at an angle relative to the bottom surface of the hull and into the paddlewheel to rotate the paddlewheel, the flow of water engaging the paddlewheel at said angle.

2. The speedometer of claim 1 in which the shaped portion of the housing gradually recesses into the housing in the direction of the paddlewheel.

3. The speedometer of claim 2 in which the shaped portion of the housing hull has only one radius to direct the flow of water into the paddlewheel.

4. The speedometer of claim 3 in which the radius of the shaped portion of the housing ranges from about 75 mm to 150 mm.

5. The speedometer of claim 2 in which the length of the shaped portion of the housing ranges from about 6 mm to 50 mm.

6. The speedometer of claim 2 in which the shaped portion of the housing recesses into the housing about 2 mm.

7. The speedometer of claim 1 in which the outer periphery of the paddlewheel is above the bottom surface of the hull.

8. The speedometer of claim 1 further comprising a sensor mounted within the housing for sensing rotation of the paddlewheel.

9. The speedometer of claim 8 in which the paddlewheel is formed of magnetic material and the sensor is a Hall-effect sensor.

10. A marine speedometer for mounting to the exterior transom of a marine vessel, the marine vessel having a hull with an outer surface that includes a bottom surface, the speedometer comprising:

a housing having an outer periphery, the housing being mounted to the transom such that the housing extends beyond the outer surface of the hull, the outer periphery of the housing extending downwardly no further than the bottom surface of the hull at the transom;

a paddlewheel affixed to the housing, the paddlewheel having an outer periphery which extends beyond the outer surface of the hull and extends downwardly no further than the bottom surface of the hull of the marine vessel at the transom, a portion of the housing adjacent to the bottom surface of the hull being shaped to direct a flow of water passing by the transom upwardly at an angle relative to the bottom surface of the hull and into the paddlewheel to rotate the paddlewheel, the flow of water engaging the paddlewheel at said angle, the shaped portion of the housing has only one radius which gradually recesses into the housing in the direction of the paddlewheel; and a sensor mounted within the housing for sensing rotation of the paddlewheel.

11. The speedometer of claim 10 in which the radius of the shaped portion of the housing ranges from about 75 mm to 150 mm.

12. The speedometer of claim 10 in which the length of the shaped portion of the housing ranges from about 6 mm to 50 mm.

13. The speedometer of claim 10 in which the shaped portion of the housing recesses into the housing about 2 mm.

14. The speedometer of claim 10 in which the outer periphery of the paddlewheel is above the bottom surface of the hull.

15. The speedometer of claim 11 in which the paddlewheel is formed of magnetic material and the sensor is a Hall-effect sensor.

16. A method of sensing the speed of a marine vessel, the marine vessel having a hull with an outer surface that includes a bottom surface, the method comprising the steps of:

mounting a housing having an outer periphery to the exterior transom of the marine vessel such that the housing extends beyond the outer surface of the hull, the outer periphery of the housing extending downwardly no further than the bottom surface of the hull at the transom;

affixing a paddlewheel to the housing, the paddlewheel having an outer periphery which extends beyond the outer surface of the hull and extends downwardly no further than the bottom surface of the hull of the marine vessel at the transom; and rotating the paddlewheel by directing a flow of water passing by the transom upwardly at an angle relative to the bottom surface of the hull and into the paddlewheel with a shaped portion of the housing adjacent to the bottom surface of the hull, the flow of water engaging the paddlewheel at said angle.

17. The method of claim 16 further comprising the step of sensing the rotation of the paddlewheel with a sensor mounted within the paddlewheel.

18. The method of claim 16 further comprising the step of gradually recessing the shaped portion of the housing into the housing in the direction of the paddlewheel.

19. The method of claim 18 in which the shaped portion of the housing has only one radius to direct the flow of water into the paddlewheel.

20. The method of claim 19 in which the radius of the shaped portion of the housing ranges from about 75 mm to 150 mm.

21. The method of claim 18 in which the length of the shaped portion of the housing ranges from about 6 mm to 50 mm.

22. The method of claim 18 in which the shaped portion of the housing recesses into the housing about 2 mm.

23. The method of claim 16 further comprising the step of positioning the paddlewheel within the housing such that the outer periphery of the paddlewheel is above the bottom surface of the hull.

24. A method of sensing the speed of a marine vessel, the marine vessel having a hull with an outer surface that includes a bottom surface, the method comprising the steps of:

mounting a housing having an outer periphery to the exterior transom of the marine vessel such that the housing extends beyond the outer surface of the hull, the outer periphery of the housing extending downwardly no further than the bottom surface of the hull at the transom;

affixing a paddlewheel to the housing, the paddlewheel having an outer periphery which extends beyond the outer surface of the hull and extends downwardly no further than the bottom surface of the hull of the marine vessel at the transom;

rotating the paddlewheel by directing a flow of water passing by the transom upwardly at an angle relative to the bottom surface of the hull and into the paddlewheel with a shaped portion of the housing adjacent to the bottom surface of the hull, the flow of water engaging the paddlewheel at said angle, the shaped portion of the housing has only one radius which gradually recesses into the housing in the direction of the paddlewheel; and sensing the rotation of the paddlewheel with a sensor mounted within the paddlewheel.

25. The method of claim 24 in which the radius of the shaped portion of the housing ranges from about 75 mm to 150 mm.

26. The method of claim 24 in which the length of the shaped portion of the housing ranges from about 6 mm to 50 mm.

27. The method of claim 24 in which the shaped portion of the housing recesses into the housing about 2 mm.

28. The method of claim 24 further comprising the step of positioning the paddlewheel within the housing such that the outer periphery of the paddlewheel is above the bottom surface of the hull.

29. A method of sensing the speed of a marine vessel, the marine vessel having an exterior transom and a hull with a bottom surface, the method comprising the steps of:

affixing a paddlewheel to the exterior transom of the marine vessel, the paddlewheel having an outer periphery which extends no further than the bottom surface of the hull of the marine vessel at the transom; and rotating the paddlewheel by directing a flow of water passing by the transom upwardly at an angle relative to the bottom surface of the hull and into the paddlewheel with a shaped portion on the transom, the flow of water engaging the paddlewheel at said angle.

* * * * *